United States Patent [19]

Inuzuka et al.

[11] Patent Number: 4,563,079

[45] Date of Patent: Jan. 7, 1986

[54] IMAGE FORMATION APPARATUS WITH VARIABLE SCANNING STROKE

[75] Inventors: Tsuneki Inuzuka, Machida; Yoshihiro Kawatsura; Masato Ishida, both of Kawasaki, all of Japan

[73] Assignee: Canon Kabushiki Kaisha, Tokyo, Japan

[21] Appl. No.: 598,545

[22] Filed: Apr. 12, 1984

Related U.S. Application Data

[63] Continuation of Ser. No. 486,874, Apr. 21, 1983, abandoned, which is a continuation of Ser. No. 149,430, May 13, 1980, abandoned.

[30] Foreign Application Priority Data

| May 17, 1979 [JP] | Japan | 54-60786 |
| May 17, 1979 [JP] | Japan | 54-60788 |
| Jul. 16, 1979 [JP] | Japan | 54-98986[U] |

[51] Int. Cl.[4] ............................................ G03G 15/28
[52] U.S. Cl. ......................................... 355/8; 355/14 R
[58] Field of Search ............... 355/3 SH, 3 TR, 14 C, 355/14 SH, 14 R, 8

[56] References Cited

U.S. PATENT DOCUMENTS

| 3,078,770 | 2/1963 | Hunt et al. ........................ 355/14 R |
| 3,655,283 | 4/1972 | Margulis et al. .................. 355/14 R |
| 3,865,482 | 2/1975 | Bendall et al. ................... 355/14 SH |
| 3,960,446 | 6/1976 | Ogawa et al. ................. 355/14 SH X |
| 4,025,187 | 5/1977 | Taylor et al. ..................... 355/14 SH |
| 4,139,300 | 2/1979 | Katayama et al. ............. 355/14 R X |
| 4,184,424 | 1/1980 | Okada et al. ...................... 355/3 SH |
| 4,204,668 | 5/1980 | Yanagawa ........................ 355/3 SH |
| 4,211,482 | 7/1980 | Arai et al. ...................... 355/14 C X |
| 4,236,808 | 12/1980 | Tusso et al. ................... 355/3 SH X |
| 4,278,341 | 7/1981 | Burgess et al. .................... 355/3 SH |
| 4,312,587 | 1/1982 | Ariga et al. .................. 355/14 R X |

*Primary Examiner*—Keith E. George
*Attorney, Agent, or Firm*—Fitzpatrick, Cella, Harper & Scinto

[57] ABSTRACT

An image formation apparatus has a first feeder for feeding a copy sheet from a container containing a number of copy sheets therein, and a second feeder for feeding a copy sheet supplied manually thereto. Both feeders feed the copy sheet to an image formation station, and a scanner exposure-scans an original image to form a copy image. A first detector detects the size of manually supplied copy sheets, and a second detector detects the size of the copy sheets in the container. A controller controls the movement of the scanner in accordance with detection by the first and second detectors, so that the scanning stroke length of the scanner is station coordinated for the size of the copy sheet manually supplied to the image formation and supplied from the container.

22 Claims, 15 Drawing Figures

IMAGE FORMATION APPARATUS WITH VARIABLE SCANNING STROKE

This application is a continuation of application Ser. No. 486,874 filed Apr. 21, 1983, now abandoned, which is a continuation of U.S. Ser. No. 149,430 filed May 13, 1980, now abandoned.

BACKGROUND OF THE INVENTION

1. Field of the Invention

This invention relates to an image formation apparatus such as a copying apparatus or a recording apparatus having a mechanism for manually or automatically feeding sheets.

2. Description of the Prior Art

There are known apparatus in which a sheet is fed from a place such as a cassette containing a number of sheets therein and exposure or image transfer is applied to the sheet to obtain a copy image or a sheet is manually fed to obtain a copy image thereon.

It is particularly convenient to manually feed a sheet along another path and preferentially obtain a copy image on the sheet which is different in size or paper quality from the sheets contained in the cassette.

However, provision of independent and exclusive paths for manually supply and automatic supply from a cassette which lead to the image formation station would result in a bulky and complicated construction of the copying apparatus.

Also, feeding sheets by the use of a common path would cause jam of the sheets or apparatus trouble which would be inconvenient to the operator.

In a case where the cassette process sequence is controlled by the same control circuit in accordance with various signals from the cassette, the process sequence concerned with the manual supply may also be controlled by those signals and this may cause a process trouble or cause formation of an incomplete image on the manually supplied sheet.

It would also be convenient to make it possible to form an image on manually supplied sheets of different sizes. However, when a sheet of a width smaller than the width of the insertion bed is inserted, the sheet may be obliquely inserted with a result that an image is formed at an unsuitable position on the sheet or the sheet jams.

In a case where a sheet is supported and fed so as to be inserted into the apparatus and then a copy start button is operated, the operator is required to use both of his hands and this means very poor operability. Moreover, it is very difficult to insert a sheet for straight feed and it is often the case that the sheet is fed obliquely.

Particularly, in a transfer type copying apparatus, where the sequence control is effected by detecting a manually supplied sheet, it is necessary to select the position of the sheet detector to an optimal position so as not to harm the image transfer registration. This imposes a limitation on the compactness of the copying apparatus.

In a transfer type copying apparatus, if the path leading to the image transfer station is long, sheet jam or image transfer misregistration is liable to occur. For example, there are apparatus in which a sheet is stopped by stopped register rollers and image transfer registration is effected by driving a roller in synchronism with the image on the drum. In this case, the sheet is caused to strike against the register rollers to provide a flexure of the sheet, but if the path to the register rollers is long, an appropriate flexure may not be provided sometimes. This may lead to poor registration accuracy or occurrence of sheet jam.

Also, in a transfer type copying apparatus, if the photosensitive drum is made small, the time required for the leading end of the image on the drum to reach the image transfer station from the start of copying becomes so much shorter that there is not enough time allowed for good image transfer registration to be obtained, and this may result in poor registration accuracy.

Further, in a transfer type copying apparatus, an image has been formed on the photosensitive drum by reciprocal movement of an original platen to make the apparatus compact and to obtain copies of a relatively large size. However, a complicated mechanism is necessary to move the platen and automatically return it and thus, low cost and compactness of the apparatus have been difficult to provide.

Also, the compactness of the copying apparatus has been limited due to the size of its photosensitive drum and the length of the optical path of the original image relative to the drum.

SUMMARY OF THE INVENTION

It is an object of the present invention to provide an image formation apparatus such as a copying apparatus capable of sheet feeding which eliminates the above-noted disadvantages.

It is another object of the present invention to provide an image formation apparatus which is capable of forming an image at an appropriate position on a manually supplied sheet.

It is still another object of the present invention to provide an image formation apparatus in which a manually supplied sheet is prevented from jamming.

It is yet still another object of the present invention to provide an image formation apparatus in which an image can be formed on any sheet automatically fed from a cassette containing a number of sheets therein and a manually supplied sheet without disturbing the order of steps in the process sequence.

It is a further object of the present invention to provide a copying apparatus in which the copying operation on a manually supplied sheet is enhanced.

It is a further object of the present invention to provide an image formation apparatus in which no limitation is imposed on the disposition of means necessary for sheet feeding.

It is a further object of the present invention to provide a copying apparatus which is compact in size and capable of two modes of sheet feeding.

It is a further object of the present invention to provide a transfer type copying apparatus of high speed and low cost which reduces the time required for continuous copying.

It is a further object of the present invention to provide an image formation apparatus which has a mode in which sheets are repetitively automatically fed from a cassette for image formation and a mode in which a sheet is manually fed for image formation and in which during one mode of operation, the other mode of operation is inhibited.

It is a further object of the present invention to provide an image formation apparatus in which the process sequence for the cassette sheets is controlled in accordance with the cassette mode while the condition signal of the cassette mode does not affect the process sequence of the manually supplied sheet.

It is a further object of the present invention to provide a copying apparatus in which the exposure stroke control for cassette sheets and the stroke control for a manually supplied sheet are made to differ from each other and the copying time is shortened by a simple construction.

It is a further object of the present invention to provide a transfer type copying apparatus in which occurrence of image transfer misregistration is prevented to the utmost in a case where the path of cassette sheets to a rotatable member and the path of a manually supplied sheet to the rotatable member are common to each other.

It is a further object of the present invention to provide a copying apparatus in which the image formation operation is directly started by the insertion of a manually supplied sheet.

It is a further object of the present invention to provide a copying apparatus in which the start of the operation is delayed so as to enable oblique insertion of a manually supplied sheet to be corrected.

It is a further object of the present invention to provide an image formation apparatus in which, in a case where sheet feeding is controlled by detecting a manually supplied sheet, the image transfer position adjustment is accurately effected without imposing limitations on the position of the detector and the length of the sheet path.

It is a further object of the present invention to provide an image formation apparatus in which the image transfer position adjustment is accurately effected even if the path along which is a manually supplied sheet or a cassette sheet passes to the image transfer station is longer than the length from the latent image formation station on the rotatable member to the image transfer station.

It is a further object of the present invention to provide an image formation apparatus in which the image transfer position adjustment is accurately effected by using means for picking up a cassette sheet.

It is a further object of the present invention to provide an improvement in a copying apparatus wherein the sheet feed for the next copying is effected in the preceding copying cycle to shorten the continuous copying interval.

It is a further object of the present invention to provide an improved process sequence control in a compact copying apparatus using a reciprocally movable original platen.

It is a further object of the present invention to provide a low-cost, compact, transfer type copying apparatus in which occurrence of jam is reduced and a transfer image can be formed at an accurate position on a manually supplied sheet.

It is a further object of the present invention to provide a compact copying apparatus in which an image is formed on a small drum consisting of a seamless photosensitive medium by a scanning system provided by an optical system having a shortened optical path length and a movable original platen, to thereby produce a transfer copy.

It is a further object of the present invention to provide a compact copying apparatus, particularly a transfer type compact copying apparatus which is high in performance, short in copying interval and low in cost due to improved sheet feed control, change-over control of the optical path of the lamp and improved control of the platen movement.

The invention will become fully apparent from the following detailed description thereof taken in conjunction with the accompanying drawings.

BRIEF DESCRIPTION OF THE DRAWINGS

FIGS. 7-1 and 7-2 are diagrams of the control circuit in the apparatus of FIG. 1.

DESCRIPTION OF THE PREFERRED EMBODIMENTS

Figure 1:
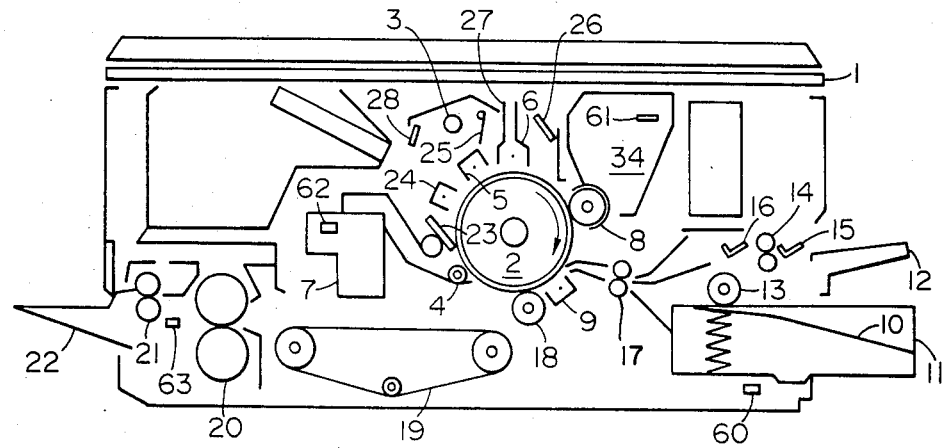
FIG. 1 is a cross-sectional view of the image formation apparatus according to the present invention.

Embodiments of the present invention will hereinafter be described with reference to the drawings. Referring to FIG. 1 which is a cross-sectional view of the copying apparatus according to the present invention, the copying apparatus includes a reciprocable platen 1 for supporting an original thereon, a rotatable drum 2 having a seamless photosensitive medium on the periphery thereof, a lamp 3 for exposing the drum 2 to the original image on the platen 1, a corona charger 5 for precharging the surface of the photosensitive medium to the positive polarity, a corona charger 6 for discharging the surface of the photosensitive medium to the negative polarity with the exposure image, a developing device 8 for developing an electrostatic latent image, a charger 9 for transferring the developed image to transfer paper 10, a cassette 11 containing a number of sheets of transfer paper 10 therein and removably mounted on the apparatus body, a bed 12 for manually supplying transfer paper 10, a roller 13 for feeding the transfer paper from the cassette, a pair of rollers 14 for feeding the transfer paper from the manual supply bed 12, microswitches 15 and 16 for detecting the manually supplied transfer paper, a pair of register rollers 17 for registering the leading end of the transfer paper to the leading end of the image on the drum, a roller 18 for separating the transfer paper from the drum, a belt 19 for conveying the transfer paper, fixing rollers 20, rollers 21 for discharging the transfer paper into a tray 22, a blade cleaner 23 for removing any remaining toner from the drum, a magnet roller 4 for collecting the toner removed by the blade 23, a container 7 for containing the toner collected by the roller 4, a minus corona charger 24 for removing any remaining charge on the drum, a shutter 25 for imparting the light from the exposure lamp 3 directly to the exposed surface of the drum for a predetermined time, mirrors 26 and 28 for imparting the light from the lamp 3 directly to the surface of the drum, and a cellfock lens 27 for causing the light of the lamp 3 reflected from the original to be imaged on the surface of the drum.

Operation will now be described. When a main switch is closed, a motor for driving the drum 2 is energized and the lamp 3 is turned on and the shutter 25 is opened while, at the same time, the corona charger 6 is energized and the drum 2 is rotated. Thereby, the drum surface is pre-cleaned to remove any remaining toner and charge and memory therefrom. When the fixing rollers 20 are heated to the fixing temperature by an internal heater, a copy signal is generated. Where a copy switch is not closed or where a sheet is not manually inserted, the drum still continues to rotate thereafter and, when a predetermined number of pulses from a rotary encoder provided in the drum driving system and adapted to generate n pulses for one full rotation of the drum are counted, the drum is stopped from rotating. The above-described drum rotation is referred to as the first pre-rotation.

When the copy switch is closed or a sheet is manually inserted during the rotation or the stoppage of the drum, the shutter 25 is closed and the drum 2 makes substantially one full rotation (hereinafter referred to as the second pre-rotation), whereafter the platen 1 starts its forward movement and the original on the platen 1 begins to be slit-exposed. The drum is slit-exposed to the reflected image of the original through the cellfock lens. The photosensitive medium of the drum comprises, in succession from the surface thereof, an insulating layer, a photoconductive layer and an electrically conductive layer and, when the surface charged by the charger 5 reaches an exposure surface, plus charge is removed by the minus charger 6 and the optical image. When that surface reaches an uniform exposure surface, an electrostatic latent image of high contrast is formed on the drum surface by the light from the mirror 26. The latent image is imparted toner at the developing area and developed into a visible image. The visible image is transferred to transfer paper at the image transfer area by the plus potential of the image transfer charger. The transfer paper is one which has been fed there by the timing operation of the paper feed roller 13, and passes through the image transfer area at the same velocity as the peripheral velocity of the drum with the aid of the register rollers 17. After the image transfer, the transfer paper is separated from the drum by the roller 18 and conveyed to the fixing rollers 20 by the belt 19, whereby the image on the transfer paper is fixed, whereafter the transfer paper is discharged into the tray 22 by the roller 21. After completion of the image transfer, the drum surface is cleaned by the blade 23 and discharged by the charger 24 and the memory thereon is removed by the light from the lamp 3 through the mirror 28.

Where continuous copying is effected from the same original, the platen 1 repeats its reciprocal movement over a number of times set by the ten keys of the apparatus operating portion.

Figure 2:
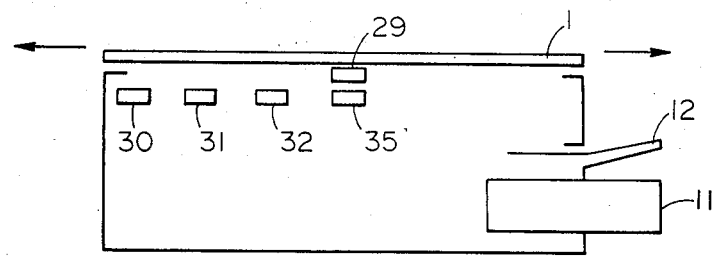
FIG. 2 is a cross-sectional view of the original platen portion in FIG. 1.

FIG. 2 shows a portion around the platen. The platen has a magnet 29 thereon, and reed switches 30, 31, 32 and 33 adapted to be actuated by the passage of the magnet are disposed along the path of movement of the platen. When the magnet actuates the reed switch 35, the platen is stopped at its initial position in the center of the body, and when the magnet actuates the reed switch 30, the platen is changed over to the rightward or forward movement for the exposure. The switch 31 is for feeding paper by the paper feed rollers 13 and 14, and the switch 32 is for feeding paper by the register rollers 17. In the case of continuous copying, when the first slit scanning is terminated and the platen is moved backwardly to actuate the switch 30, the platen again starts its forward movement and effects the second scanning. In this manner, a set number of copies are obtained. The lamp 3 and simultaneous charger 6 are turned on in synchronism with the rotation of the main motor, namely, the drum, and the primary charger 5 and precharger 24 are turned on except during the post-rotation cycle. The lamp 3 is controlled so as to emit a high intensity of light during the scanning movement of the platen.

In the case of manual supply copying, when a sheet is inserted from the bed 12, the detector 15 detects the sheet. Then, the feed rollers 14 are operated to introduce the sheet into the apparatus. However, the rollers 14 are not operated for a predetermined time (about two seconds) after the detector 15 has detected the sheet. This time allowance is for preventing oblique insertion of the sheet or for correcting the sheet to straight movement or enabling the sheet to be replaced by another one. When that time has elapsed, the rollers 14 are operated and also the drum 2 is rotated to carry out a process sequence similar to that in the case where the copy switch is closed. The drum 2 starts the second pre-rotation as soon as the detector 15 detects the sheet, whereby the copy starting time can be quickened. Also, when the sheet insertion is detected by the detector 15, the feeding of sheets from the cassette is stopped. In the manner described above, copying can be started simply by inserting a sheet without closing the copy switch of the operating portion, and the sheet is fed into the apparatus while maintaining an accurate sheet position, so that toner image can be transferred to the sheet at a predetermined location thereof and jam of the sheet can be prevented.

When the switch 16 detects that the trailing end of the sheet has passed, the rollers 14 are stopped, thus becoming prepared for the insertion of the next sheet.

Figure 13:
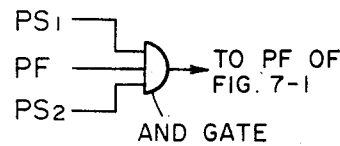
FIG. 13 is a diagram of another circuit concerned with sheet feeding.

Now, a plurality of such detectors 15 may be provided at a right angle to the direction of feed of sheets. These are for detecting oblique movement of a sheet and the rollers 14 are not operated until both such detectors 15 detect a sheet. Also, design may be made such that the second operation of the rollers 14 takes place only when there are outputs of both of the detector 15 and detector 16, as shown in FIG. 13. Thereby, jam can be prevented.

Figure 3:
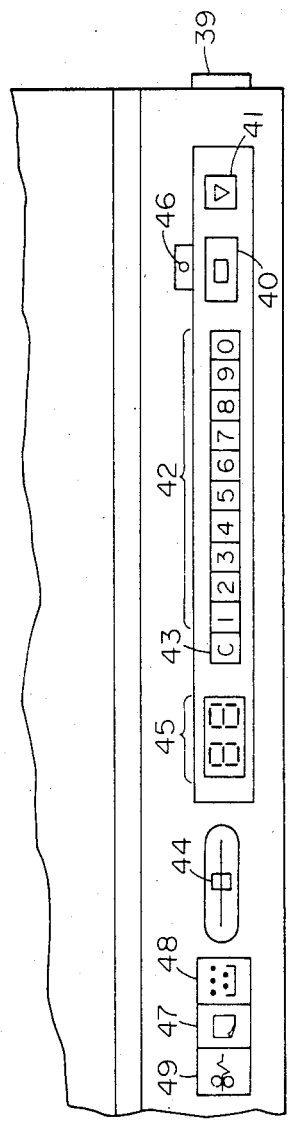
FIG. 3 is a fragmentary plan view of the FIG. 1 apparatus.

FIG. 3 is a plan view of the operating portion of the FIG. 1 copying apparatus. It includes a main switch 39, a copy start key switch 40, a stop key switch 41 for interrupting continuous copy, a set of ten keys 42 for causing a number to be stored in a memory to set the number of continuous copies, a clear key 43 for clearing the number stored in the memory, a copy gradation setting lever 44, a 7-segment displayer 45 for displaying the memory number, a wait lamp 46 adapted to be turned on for display until the fixing temperature is reached, a lamp 47 for displaying the absence of the cassette and of sheets in the cassette, and a lamp 48 for displaying when the container 7 for collecting the used toner by the cleaner is filled with such toner. Designated by 49 is a displayer for displaying when a sheet jams. When a sheet is jamming, the clear key and the ten keys are not operable, but during the waiting, these keys are operable.

The segment displayer 45 displays a zero-suppressed 1, irrespective of the waiting time, upon closing of the main switch 39, displays the set number minus 1 upon termination of each copy, and again displays the set number upon completion of the set number of copies and thereafter, when 30 seconds elapses without the copying being started, it again displays 1. Thereby, one-sheet copying can be started without the number setting by the ten keys and the re-start of the copying can be executed smoothly.

The wait displayer 46 is turned on and off by the closing of the main switch 39, and is statically turned on when the temperature of the fixing rollers is not reduced below the fixing temperature, namely, when a short time has elapsed after the previous operator has opened the main switch 39, but is turned on and off when the temperature of the fixing rollers is below the fixing temperature (wait). The wait displayer is turned on also when the waiting time has elapsed after the fixing rollers have risen to the fixing temperature. When the main switch is opened, both the turn-on-and-off and the turn-on condition are extinguished and the wait displayer displays the main switch off condition. Further, when the copy switch is closed after wait-up, turn-on-and-off operation having a longer turn-on-and-off interval than that during the waiting is effected until the mode shifts to the post-rotation mode. That is, a single wait displayer can display four conditions, namely, the closed main switch condition, the wait condition during which copying is impossible, the ready-to-copy condition, and the copy cycle and thus, the number of displayers can be saved and this contributes to reduced cost of the apparatus.

An overflow displayer 48 detects and displays the overflow condition of the container 7 and also detects deficiency of toner in the developer container 33, whereupon it is statically turned on for display. In the former case, a lamp may be turned on and off and in the latter case, the lamp may be statically turned on.

The paper absence displayer 47 may be turned on and off in case of the absence of paper, and may be statically turned on in case of the absence of the cassette.

Also, when toner deficiency in a hopper 33 or the overflow of the collecting container 7 is detected and where the continuous copying for the number of sheets set by the ten keys is being executed, the copying is continued until the set number of copies is completed and thereafter, re-start of the copying is prevented. Thus, the display for warning is effected, but the copying is continued rather than immediately interrupted to make the series of copying operations stagnant and aggravate the substantial copying speed, because even if the toner is deficient or overflow takes place, the image will not be suddenly aggravated nor will the apparatus be contaminated. When transfer paper jams, the operation of the apparatus is immediately stopped to secure the safety of the apparatus. For the stop key, paper absence and cassette absence signal, the operation of the apparatus is not immediately interrupted but the current process cycle is permitted to be completed, whereafter the start of the subsequent cycle is prevented.

Figure 4:
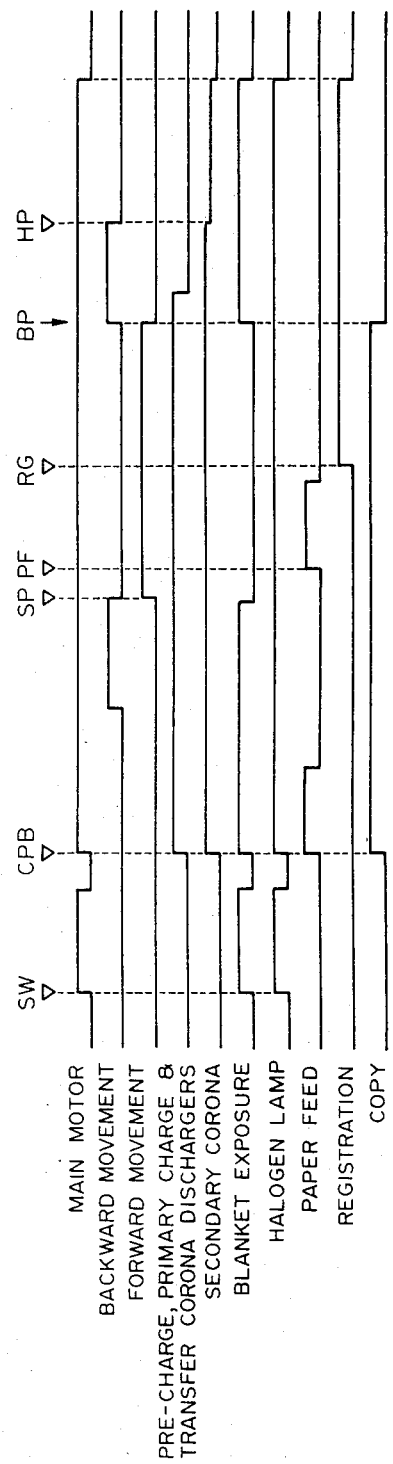
FIG. 4 is an operation time chart for the apparatus of FIG. 1.

With reference to FIG. 4 which is an operation time chart of the FIG. 1 copying apparatus, the operation sequence of scanning and the operation timing will be described in detail.

Before the copy switch 40 is closed, the platen 1 is positioned centrally of the body as shown in FIG. 1. When the copy switch 40 is closed, the pre-discharging charger 24, the lamp 3, the primary charger 5, the secondary charger 6, the image transfer charger 9 and the shutter 25 are energized, so that pre-corona, primary corona, secondary corona, image transfer corona, pre-discharging exposure, blanket exposure and uniform exposure are imparted to the photosensitive medium, which thus becomes ready to start copying. The lamp 3 is turned on with weak light.

When said predetermined number of pulses are counted, namely, when the drum makes a predetermined rotation, the platen 1 begins to move from the position of FIG. 1 to the left, and thereafter when the drum has made substantially one full rotation, the switch 30 is closed and therefore, the platen is stopped, and then starts to move rightwardly for exposure. The lamp 3 is now turned on with intense light and the shutter is deenergized to stop the blanket exposure and effect the exposure. The blanket exposure is an exposure whereby, when image exposure is not taking place, light is applied to the image-exposed surface so as to prevent occurrence of irregularity in the potential on the photosensitive medium. Also, by changing over the lamp between the intense light and the weak light, various process exposures can be appropriately accomplished by a single lamp.

After image exposure has been done over substantially one full and half rotation, the movement of the platen 1 is stopped and then the platen is moved to the left. The start of this movement is effected by counting said predetermined number of pulses, and the number set in the memory is set in a register for copy counting and 1 is subtracted from that number. As a result, the content of the register becomes 0 in case of a single sheet copy and thus, the re-start of the subsequent copying cycle is prevented. During this rightward movement, the reed switch 31 of FIG. 2 is actuated to operate the paper feed roller 13 or 14 and the reed switch 32 is actuated to operate the register roller 17, thereby feeding a sheet. Even if the reed switches 31 and 32 are actuated during the platen movement at the other time than exposure, the rollers 13, 14 and 17 will not be operated.

When the platen 1 actuates the switch 35 in its initial position, it is stopped from moving. Then, the lamp 3 is controlled to its weak turn-on and the shutter is operated to start the blanket exposure by the weak turn-on of the lamp 3. Thereafter, the drum rotation is continued so that the photosensitive medium is electrically and mechanically cleaned and, after substantially one full rotation of the drum, the process load as shown in FIG. 4 is removed and the drum rotation is stopped. After this stoppage, the main switch on condition is continued.

In the case of continuous copying, even if the switch 35 is closed, the platen 1 is not stopped but continues to move leftwardly and when it actuates the switch 30, rightward movement of the platen 1 is again started and turns on the lamp 3 with intense light and deenergizes the shutter, thus re-starting the image exposure.

In the present embodiment, one cycle of exposure scanning is effected with the platen being changed twice in its direction of movement and therefore, as shown in FIG. 1, the platen can be set at the center during stoppage of the copying. Also, copies of a full size corresponding to the body size can be produced and this leads to compactness of the machine. Moreover, the control of the two changes in direction is effected by the platen position switches and pulse count timer and this eliminates the necessity of providing a complicated spring mechanism for changing the direction. Further, the reed switch 35 is provided with a plurality of functions which will later be described and thus, any cumbersomeness caused by the reed switch which would otherwise detract from the compactness of the machine may be prevented.

The time whereat the rightward movement for exposure should be stopped and the direction of movement should be changed is determined in accordance with the size of sheets in the cassette 10 and the size of the sheet manually supplied from the manual supply bed 12.

Some of the foregoing and the following embodiments of the present invention are also applicable to copying apparatus which have a first mirror movable at a velocity of V and a second mirror movable at a velocity of $(\frac{1}{2})V$ and in which exposure scanning is effected by reciprocal movement of these mirrors, and are also applicable to copying apparatus in which a roll of paper is cut into the length of the size carried on the platen and the thus cut paper is automatically fed, or to copying apparatus in which the latent image on the drum is transferred to a sheet and such sheet is developed. The present invention is also applicable to copying apparatus in which copy image is directly formed on a sheet without the intermediary of a drum or to copying apparatus in which other data than an original document is printed on a sheet.

Figure 5:
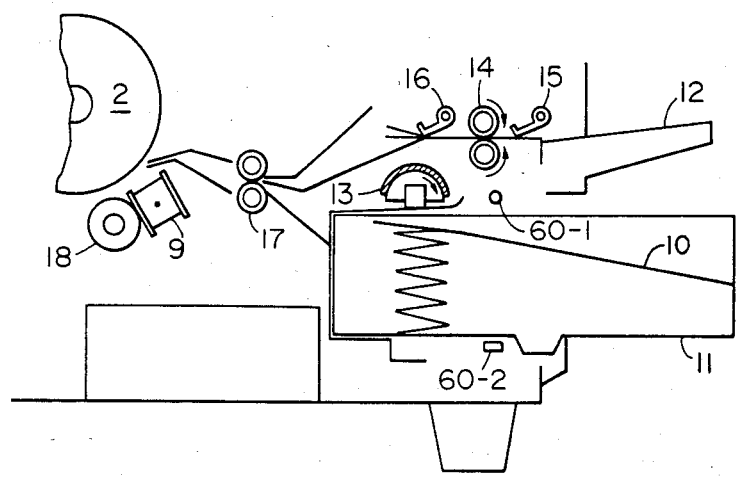
FIG. 5 is a cross-sectional view of the sheet feeding portion of the FIG. 1 apparatus.
Figure 6:
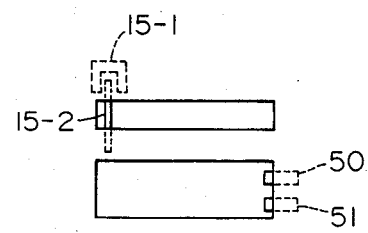
FIG. 6 is a right-hand front view of the portion shown in FIG. 5.

FIG. 5 is a vertical cross-sectional view of the cassette portion and manual supply portion, and FIG. 6 is a plan view thereof. Designated by 15-1 is a photointerrupter constituting a manually supplied sheet detector 15, denoted by 15-2 is an actuator piece swingable upon insertion of sheet, and designated by 50 and 51 are microswitches adapted to be actuated by a cam provided on the cassette when the cassette is mounted in the apparatus body. When both of the switches 50 and 51 are in OFF position, there is generated a signal meaning the absence of a cassette; when the switches 50 and 51 are in ON and OFF positions, respectively, there is generated a signal meaning the presence of a cassette having sheets of the half-size, namely, A4 or B5 size; when the switches 50 and 51 are in OFF and ON positions, respectively, there is generated a signal meaning the presence of a cassette having sheets of B4 size; and when both of the switches are in ON position, there is generated a signal meaning the presence of a cassette having sheets of the full-size, namely, A3 or B4 size. The three different signals for these sizes are used to determine the exposure stroke of the platen 1.

With regard to manually supplied sheets, the full-size includes B4 size and so, the two sizes, i.e. the half-size and the full-size are detected by the sheet detector 15.

Accordingly, where sheets are continuously fed from the cassette to execute the production of multiple copies, the copying cycle is repeated as a stroke corresponding to each size, namely, in a minimum time, whereby the time required for the copying can be reduced. This, coupled with the aforementioned effect of making sheet pick-up for the next sequence prior to the completion of the present sequence to thereby reduce the copying interval, provides an excellent benefit. However, in the case of manual sheet supply, it is rare that sheets are continuously fed and therefore, two series of stroke controls suffice and this leads to simplification of the control circuit and reduced malfunctioning related to the size detection.

The actuator piece of the sheet detector 15 is provided at the left end, as is shown in FIG. 6. This position corresponds to a belt provided outside of the image formation area of the drum to separate transfer paper from the drum after image transfer. This enables judgement as to whether or not a manually supplied sheet has been inserted into a separable predetermined position.

Figure 11:
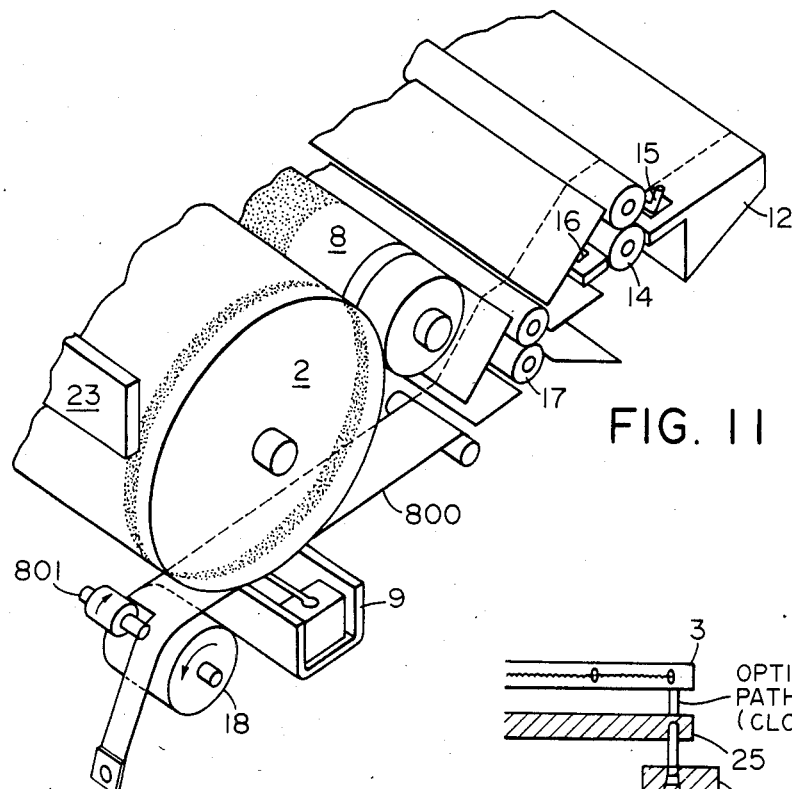
FIG. 11 is a perspective view of the separating portion.

FIG. 11 is a perspective view showing portions adjacent to the image transfer and separating station. Reference numeral 800 designates a fixed separating belt, and reference numeral 801 designates a keep roller. A sheet fed from the register rollers 17 moves with its left end portion passing under the belt 800 and the sheet contacts the moving drum due to the electrostatic attraction between it and the drum, whereby toner image is transferred to the sheet with the aid of the corona charger 9. The sheet having the toner image transferred thereto passes between the roller 18 and the belt 800 while being held down by the roller 801, and is separated from the drum. If the manually supplied sheet detector 15 or 16 is provided at a position corresponding to this belt 800 with respect to the direction of movement of the sheet on its path, the insertion of the manually supplied sheet can be detected by a single detector and also appropriate position setting of the sheet can be accomplished.

Figure 12:
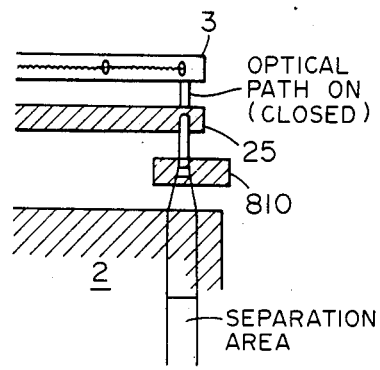
FIG. 12 is a plan view of the drum in the exposure portion.

FIG. 12 is a fragmentary plan view of the drum, in which reference numeral 810 designates a sharp cut window for preventing adherence of toner in the separation width portion.

During the forward movement of the platen, the light from the original illuminating lamp 3 is applied through the sharp cut exposure window 810 to that portion of the drum which is in contact with the separating belt 800. Thus, the charge in that portion is erased to prevent adherence of toner and the separation width portion is secured. This is irradiated with light through a slit of the shutter portion and a fixed window to expose the shutter 25 to light even during the closed condition of the shutter 25. Accordingly, the sheet detectors 15 and 16 are provided so as to correspond to the belt 800 and the sharp cut optical path.

The sheet detector 16 is provided at the same left end position as the sheet detector 15 with respect to the photosensitive medium. This detector 16 has the following three functions. A first function is to detect the size of a manually supplied sheet and when the detector 16 does not detect a sheet at a predetermined time, the size of the sheet is judged as the half-size and when the detector 16 detects a sheet at the predetermined time, the size of the sheet is judged as the full-size. A second function is to render the length of the path from the leading end of a manually supplied sheet to the register rollers equal to the length of the path from the cassette sheet. Also, where the path to the register rollers is relatively long, the flexure of the sheet formed by the sheet striking against the register rollers is not always constant so that the image transfer registration is sometimes unstable. This can be prevented. That is, when the detector 16 detects a sheet fed by the manual supply rollers 14, these rollers 14 are deactivated after a predetermined time and wait while becoming prepared to feed the sheet to the register rollers. The rollers 14 are again operated by the signal from the reed switch 31 and begin to feed the sheet to the register rollers. A third function is to stop the rollers 14 when the detector 16 detects the trailing end of the sheet, and to become prepared for the next sheet.

The operation of the sheet detector 15 detecting a sheet to operate the rollers 14 and of the sheet detector 16 detecting that sheet to deactivate the rollers 14, namely, the preparatory feeding and waiting, is for preventing the function of the register rollers from being damaged and more particularly, for ensuring the mountain of the loop (flexure) of the sheet formed by the sheet striking against the stopped register rollers is kept down to a suitable range. Accordingly, there is little possibility of sheets being broken or jamming. Moreover, this is accomplished by a single roller, which leads to ease and lower cost and so that the machine may be made compact.

This also holds true with the paper feed from the cassette. That is, the paper feed roller 13 is operated for a little time by the closing of the copy switch to pull out a sheet from the cassette, and then the feed roller 13 waits. The reed switch 31 starts to feed the so pulled out sheet until the sheet reaches the register rollers.

Figure 14:
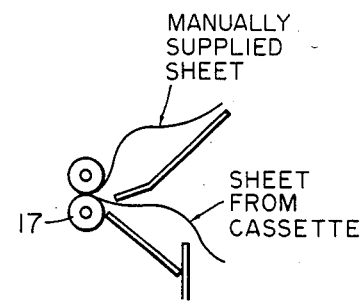
FIG. 14 shows the flexure of a sheet.

FIG. 14 shows the form of a sheet near the register rollers 17. The cassette roller 13 is of a semicircular cross-section and makes a half rotation to effect preparatory feeding, and makes a further half rotation to effect main feeding.

The present embodiment, as described above, is an image transfer type copying apparatus which is constructed by using the image scanning system provided by the reciprocal movement of the seamless photosensitive drum 2 and the platen 1 and the image exposure system for the drum provided by the cellfock lens 27, namely, the one-to-one magnification bar lens and in which the construction is improved for the purposes of further compactness, higher performance and lower cost. That is, the copying apparatus of the present embodiment has been made compact with the copy interval reduced and with the image transfer registration well maintained by the control for the change-over of the optical path by using a single lamp for various exposures, the sheet feed control for preventing an increase in number of timing rollers resulting from the sheet path, and the smooth control of changes in direction of the platen by low-cost means. Moreover, in the construction of the present embodiment, the copy size is not fixed, two series of feed paths are provided so as not to restrict the types of copy sheet, malfunctioning is eliminated and sheet jam can be prevented to the utmost. If the cellfock lens 27 is provided in a space forming the shortest distance between the drum 2 and the platen 1, as shown in FIG. 1, it will be very effective to make the apparatus compact.

Controller

Figures 1, 7:
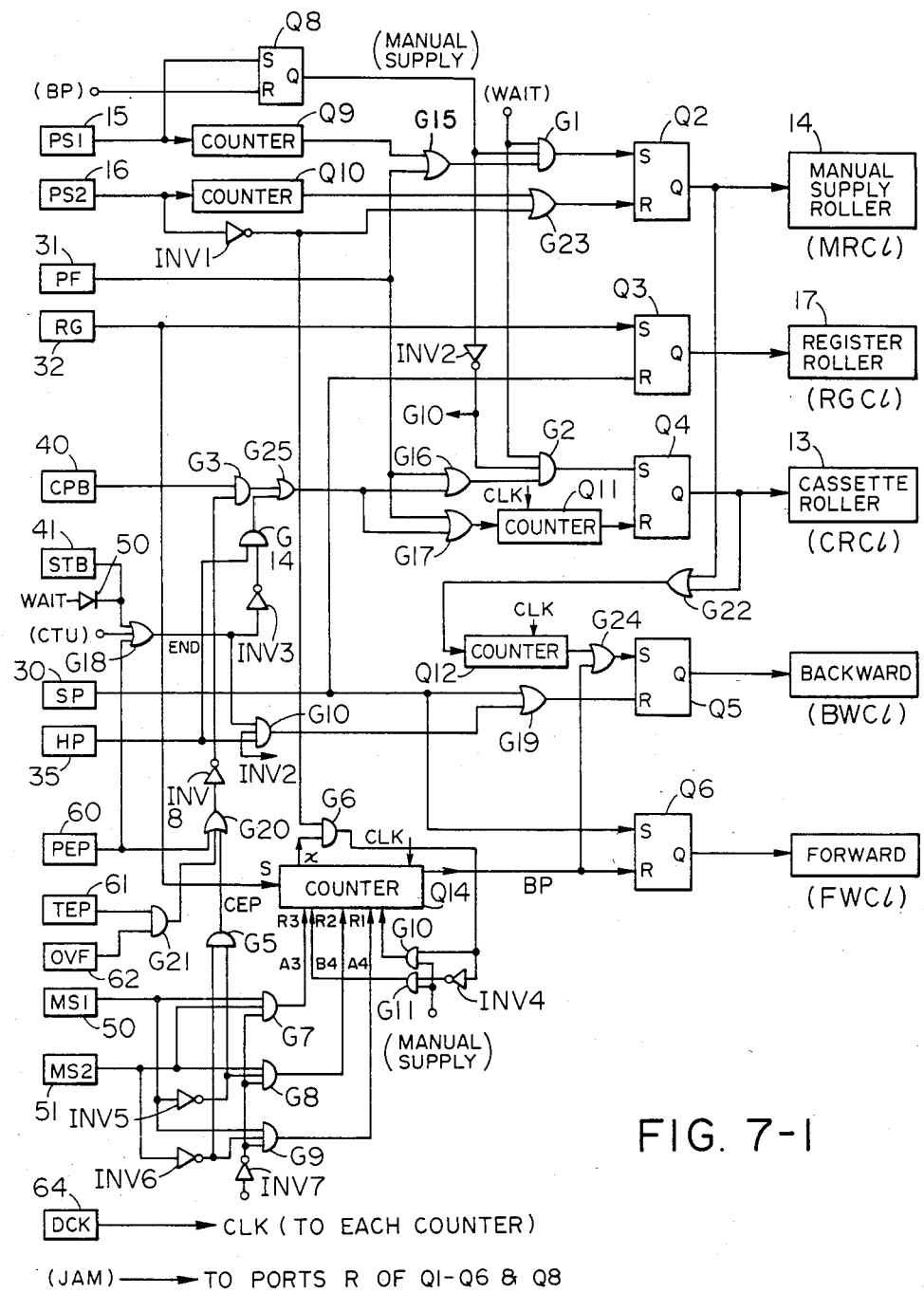
Figures 2, 7:
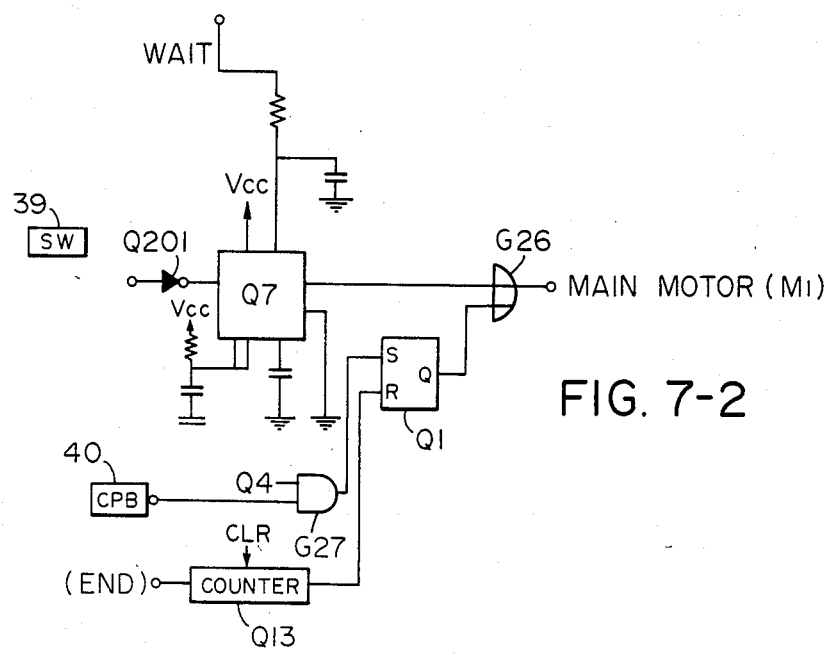
Figure 8:
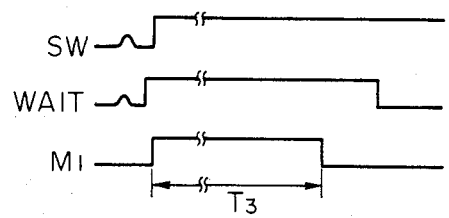
FIG. 8 is a control time chart of the circuit of FIG. 7-2.
Figure 9:
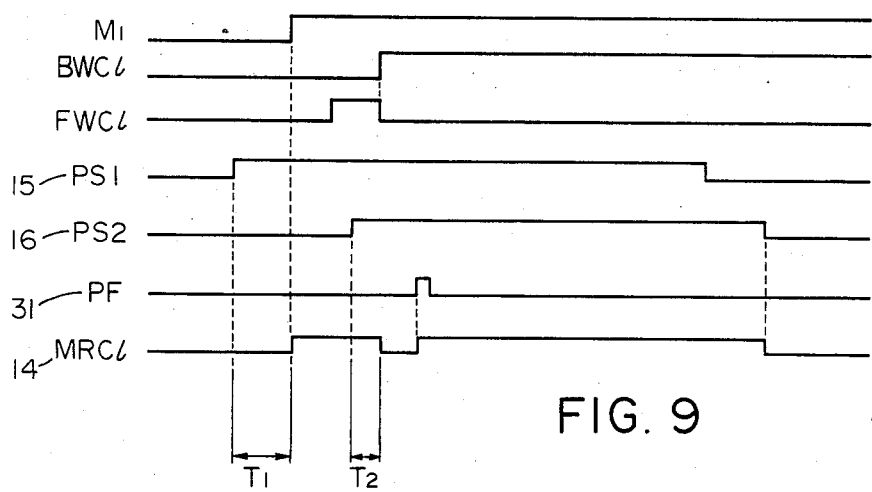
FIG. 9 is a control time chart of the circuit of FIG. 7-1.

FIG. 7 is a diagram of the operation control circuit of the FIG. 1 copying apparatus. $Q_1$-$Q_6$ designate flip-flops for operatively controlling a main motor (which operates the drum 2, various rollers and the belt 19), a clutch for operating the manual supply rollers 14, a clutch for operating the register rollers 17, a clutch for operating the cassette roller 13, a clutch for backwardly moving the platen 1, and a clutch for forwardly moving the platen 1. The flip-flops $Q_1$-$Q_6$ are switched on by a pulse rising signal to a port S, and switched off by a pulse rising signal to a port R. $Q_7$ designates a one-shot for effecting the wait control of the main motor and it generates an output of time limit $T_3$ as shown in FIG. 8 after the closing of the main switch. $Q_8$ designates a flip-flop for judging the manual supply mode and the functions of the ports S and R thereof are identical to those of the flip-flop $Q_1$ except that it is not an edge trigger. $Q_9$ denotes a timer for operating the manual supply rollers 14 and generating an output after a time limit $T_1$ as shown in FIG. 9, and it is operable on condition that an input signal shall be ON for the time $T_1$. That is, the timer $Q_9$ can complete its timer operation as long as there is an input signal, and cancels its timer operation when the input signal disappears. $Q_{10}$-$Q_{13}$ denote counters for counting clock pulses generated by the drum rotation from the point of time whereat the input signal has been entered and for generating a pulse output when the count reaches a predetermined count number. The counters $Q_{10}$ and $Q_{11}$ are for determining the deactivation of the manual supply rollers and of the cassette roller, and the counters $Q_{12}$ and $Q_{13}$ are for determining the number of pre-rotations and the number of post-rotations. N (a predetermined number) clock pulses DCK are generated at equal intervals per full rotation of the drum by the aforementioned rotary encoder. $Q_{14}$ is a counter similar to the counters $Q_{10}$-$Q_{13}$, but in case of the cassette mode, it selects a preset number in accordance with the size of the cassette and in case of the manual supply mode, it selects a preset number in accordance with the size of a manually supplied sheet in a mode different from the cassette mode. The counter $Q_{14}$ is for controlling the stroke of the platen. $G_1$-$G_{10}$ designate AND gates, $G_{13}$-$G_{23}$ denote OR gates, and $INV_1$-$INV_6$ designate inverters.

Signals $M_1$, MRCl, RGCl, CRCl, FWCl and BWCl are the signals for operating the main motor, the manual supply roller, the register rollers, the cassette roller, the forward movement of the platen and the backward movement of the platen when these signals are 1, and for deactivating these members when the signals are 0; CLK is a clock pulse; BP is a signal for reversing the platen; and END is a copy cycle interrupting signal provided by signals STB, CTU, PEP and CEP for the stop key, count up, and paper/absence and cassette absence. "Manual Supply" is a signal indicative of the manual supply mode; JAM is a signal indicative of sheet jam and generated upon detection of jam; CTU is a count-up signal of the copy counter indicative of a preset number of copies having been completed; and SW is a main switch on signal put out upon detection of the condition of the switch SW. $PS_1$ and $PS_2$ are signals put out when a manually supplied sheet is detected by the detectors 15 and 16; PF and RG are a paper feed signal and a registration signal generated when the platen has actuated the reed switches 31 and 32 as aforementioned; CPB and STB are signals generated when the copy button and stop key of the operating portion are operated; and SP and HP are signals generated when the platen has actuated the reed switches 30 and 35 and indicative of the platen forward movement start position and stop position. PEP is a signal put out when the emptiness of the cassette 10 has been optically detected by a lamp 60-1 and a light-receiving member 60-2, and CEP is a signal indicative of removal of the cassette 10 and put out by microswitches 50 and 51 operatively controlled by the cassette ON. TEP is a signal indicative of the absence of toner in the developing device 34 and put out when it is detected by a toner level detector 61 in the developing device that the level of the toner has lowered below a predetermined level, and OVF is a signal indicative of the overflow condition of the collected toner in the collecting container 7 and put out when the overflow is detected by a level detector 62. WAIT is a signal indicative of the wait condition and put out by a thermistor Th which detects the temperature of the fixing roller.

Operation will now be described. During the duration of the wait signal WAIT generated upon closing of the main switch 39, the one-shot $Q_7$ of FIG. 7-2 is operated and a main motor signal $M_1$ is put out through the gate $G_{26}$ for a time $T_3$ to effect a first pre-rotation of the drum. Thereafter, if the copy button is depressed when the wait is up (WAIT is 0) and standby has come, the flip-flop $Q_1$ is set and likewise the main motor is energized to start the process.

Cassette Mode

Now no sheet is being inserted from the manual supply bed 12 and therefore, the detector 15 is OFF and accordingly, the flip-flop $Q_8$ is OFF and consequently, a manual supply signal is not put out. Accordingly, the gate $G_1$ is OFF-controlled and the flip-flop $Q_2$ is not set and thus, the manual supply rollers 14 are not operated.

Assuming that paper is not absent and toner is not absent and no overflow is occurring, a start signal is entered into the gate $G_2$ through the gates $G_3$, $G_{25}$ and $G_{16}$ upon depression of the copy key. Since wait and manual supply reversing signals (all being 1) are applied to the other port of the gate $G_2$, the flip-flop $Q_4$ is set on and the clutch of the cassette roller 13 is engaged. While the counter $Q_{11}$ is effecting a predetermined pulse count through the gate 17, the roller 13 makes a half rotation and stops, thereby pulling out substantially one half of a sheet from the cassette and stopping the sheet. By this, the difference between the time from the copy start until image transfer and the time required for the movement of the sheet, which difference would occur where the drum is small, can be corrected.

Upon the output of this flip-flop $Q_4$, the count CLK of clock pulses is started by the counter $Q_{12}$ through the gate $G_{22}$. A predetermined number of pulses counted corresponds substantially to one full rotation of the drum, and the flip-flop $Q_5$ is set through the OR gate $G_{24}$ is put out signal FWCl, which moves the platen leftwardly. When the platen actuates the reed switch 30, the flip-flop $Q_5$ is reset through the gate $G_{19}$ to disengage the clutch FWCl while the flip-flop $Q_6$ is set to put out clutch signal BWCl, which moves the platen rightwardly. The image exposure lamp 3 is turned on and controlled in synchronism with the main motor $M_1$, and the quantity of light thereof is controlled in synchronism with the control of this BWCl so that the light is intense when BWCl is ON. The reset time of the flip-flop $Q_6$ for terminating the first slit exposure is determined by cassette switches 50 and 51.

That is, when the switches 50 and 51 are 1 and 0, respectively, sheets of size A4 are contained in the cassette and therefore, the exposure stroke is terminated at that width. That is, the preset number of the counter $Q_{14}$ which counts clock pulses and determines the reversing position is determined to n1 which is suited for A4. In case of size B4, the switches 50 and 51 are 0 and 1, respectively, and therefore, n2 greater than n1 is preset. In case of size A3, the switches 50 and 51 are 1 and 1 and therefore, n3 which is greater than n2 is set.

When the switches 50 and 51 and 0 and 0, cassette absence signal CEP is put out through the gate $G_5$.

The counter $Q_{14}$ effects pulse count after the register switch 32 has been closed and, when the count reaches the aforementioned number n1-n3, the counter puts out BP to reset $Q_6$ and terminate the forward movement. On the other hand, $Q_5$ is set by BP through the gate $G_{24}$ to move the platen leftwardly and, when the platen actuates the reed switch 35, $Q_5$ is reset to stop the backward movement.

Now, when the switch 31 is closed in the course of the forward movement of the platen, signal PF is applied to the gates $G_1$, $G_2$ and counter $Q_{11}$ through the gates $G_{15}$, $G_{16}$ and $G_{17}$. Since the gate $G_1$ is OFF as aforementioned, $Q_2$ is not set, but by the opening of the gate $G_2$, the paper feed flip-flop $Q_4$ is again set and the roller 13 is further rotated to further pull out the previously pulled out sheet. Then, the leading end of the sheet strikes against the register rollers 17 to thereby form a loop (slack) in the sheet. Thus, the sheet can be stopped by the register rollers with an appropriate amount of loop maintained in the sheet, thus eliminating the necessity of intricately taking into account the interval between the paper feed roller and the register rollers and also eliminating the necessity of providing any special means in the path, which contributes to compactness of the machine. Also, the loop can be made appropriate and constant and this can reduce jam of sheets as well as ensure stable and accurate registration between the drum image and the sheet to be accomplished by the register rollers 17. Such contrivance is also made in the case of manual supply (as will later be described).

Thereafter, by the closing of the register switch 32, the flip-flop $Q_3$ is energized to operate the rollers 17. The rollers 17 continue to rotate until the start switch 30 is closed next time.

In the case of a preset number of multi-copies, the gate $G_{10}$ is not opened even when one cycle of process has been terminated and therefore, $Q_3$ is not reset even when the stop switch 35 is closed and accordingly, the backward movement is continued until $Q_5$ is reset by closing of the start switch 30, whereupon the backward movement is stopped. At the same time, $Q_6$ is again set to start the second forward movement exposure. The gate $G_{10}$ is opened by an END signal provided by any of signal STB from the stop key 41, paper absence and cassette absence signals PEP and CEP and a signal CTU indicative of a preset number of copies having been completed. Accordingly, the gate $G_{10}$ controls the outputting of signal HP so that scanning is repeated until a preset number of copy cycles is completed and until an interruption instruction is put out from the stop key or due to paper absence. Also, $Q_4$ is set by signal HP through the gates $G_4$, $G_{25}$, $G_{16}$ and $G_2$ to feed the second and subsequent sheets. Where only one copy is desired, CTU is being put out and therefore, $Q_4$ is not set even if this signal HP is detected. Also, even when the platen starts to move upon depression of the copy button and actuates the switch 35, $Q_4$ is likewise not set.

Manual Supply Mode

The manual supply mode will now be described in detail. The operator places a sheet on the bed 12 and urges it toward the rollers 14. First, the detector 15 judges whether or not the sheet has been appropriately inserted. When signal $PS_1$ is generated, counter $Q_9$ is energized to start $T_1$ time limiting operation. Before this time $T_1$, the direction of the sheet is corrected and the sheet is caused to strike against the stopped rollers 14 so that the sheet is substantially at a right angle to the rollers 14. That is, for some time after the sheet has been inserted, the attitude of the sheet can be corrected to prevent jam thereof which would otherwise occur due to oblique movement of the sheet after feeding.

When the time $T_1$ has elapsed, the flip-flop $Q_2$ is set through the gates $G_{15}$ and $G_1$. Also, the flip-flop $Q_1$ is set through the gate $G_{27}$. The manual supply input to $G_3$ is 1, since the flip-flop $Q_8$ is set by the switch 15. Also, since the gate $G_2$ is inhibited through an inverter, the driving of the cassette roller 13 is prevented even if signal PF is generated. The drum is rotated by $Q_1$ and the manual supply rollers 14 are rotated by $Q_2$ to introduce the sheet into the apparatus. The sheet arrives at the detector 16 provided behind the rollers 14. Then, the detector generates signal PS$_2$ and the counter $Q_{10}$ starts counting toward time $T_2$. When the time $T_2$ has elasped and the count is up, $Q_2$ is reset through the gate $G_{23}$ to stop the rollers 14, which thus wait for the next paper feed step. This corresponds to the preparatory paper feed from the cassette in the cassette mode, wherein the preparatory paper feed takes place as aforementioned when the detector 15 detects a manually supplied sheet irrespective of the forward or backward movement of the platen 1.

Also, upon operation of the rollers 14, the prerotation counter $Q_{12}$ is started through the gate $G_{22}$ and after a predetermined rotation, the flip-flop $Q_5$ is set to move the platen leftwardly in the same manner as in the case of the cassette mode and, when the platen strikes against the start switch 30, the forward movement for exposure is started.

Thus, in the manual supply mode, a copy cycle can be entered without closing the copy switch 40, thereby facilitating the operation.

When the switch 31 is closed during the forward movement for exposure, $Q_2$ is again set through the gates $G_{15}$ and $G_1$ to drive the rollers 14, which thus feeds the sheet to cause it to strike against the register rollers. When the next switch 32 is closed, $Q_3$ is set in the same manner as in the case of the cassette mode, to rotate the register rollers 17, which thus feed the sheet to the image transfer station.

When the sheet leaves the detector 16, $Q_2$ is reset through an inverter and gate $G_{23}$ to stop the manual supply roller 14 from rotating. This is for the preparation for the feeding of the next sheet.

In the case of the manual supply mode, copying can be started or re-started even if there are generated paper absence, toner absence and overflow signals. In the manual supply mode, several sheets of copies at most are to be produced continuously and thus, even if 1 of TEP and OVF is generated, it will not adversely affect the image or the apparatus. Consequently, this technique sets a value on the simplicity of operation. However, it is possible to effect such a control that when TEP and OVF are 1, start of the copying (the first sheet) is permitted but the subsequent re-start is prevented or the copying is quite impossible from the first.

Even if the sheet is momentarily spaced apart from the detector 15 during the time $T_1$ set by the counter $Q_9$, the timing operation can continue and thereby prevent oblique movement of the sheet to the utmost.

The detectors 15 and 16 are disposed so as to be concerned with separation of sheets and can therefore serve also to position the sheets, and even small sheets such as postcards or the like can be copied at an appropriate position.

Detailed description will now be made of the control of the reversing of the platen in the case of manual supply. In FIG. 7, the signal PS$_2$ of the sheet detector 16 and a predetermined count number signal x from the counter $Q_{14}$ are applied to the input of $G_6$. This is for selecting one of the preset numbers n1 and n3 of the counter $Q_{14}$. That is, the counter $Q_{14}$ judges the size of a sheet as the large size (full) such as A3 or B4 when a sheet is present at the rear counter 16 for a predetermined number of pulses after the count has been started from the registration signal RG, and judges the size of a sheet as the small size (half) such as A4 when a sheet is not present, thereby bisecting the scan stroke. That is, when x is 1 and if 1 is applied to the gate $G_6$ through 0 of PS2, namely, through an inverter, n1 is preset in $Q_{14}$. If the detector 16 is still detecting a sheet when x is 1, 0 is applied to $G_6$ and n3 is preset through an inverter and gate. Accordingly, in the case of manual supply, the counter continues counting until n3 or n1 after x in accordance with the full-size or the half-size, thus putting out a reversing signal BP. Also, if manual supply again takes place during the backward movement, the output of the inverter INV2 will become 0 and so, $G_{10}$ will stop putting out its output and consequently, the switch 35 will not stop the platen but the cycle will continue.

What is important here is that since the sheet has already been fed to the register rollers 17, the timing signal x which senses the sheet detector 16 is a pulse number smaller than n$_1$ of A4 size and also is a timing generated before completion of the stroke corresponding to A4 size.

In this manner, the size data of manually supplied sheets can be sequentially judged at the interval between the process sequence controls without such data being applied in advance in any manner and this can contribute to the sequence control and simplify the circuit arrangement.

In the case of the cassette mode or in the case of the continuous multicopy operation, it is desired to increase the speed to the utmost and to set strokes corresponding to various copy sizes and therefore, three different presets are effected as shown, whereas in the case of the manual supply mode, the desired number of copies is several sheets at most and therefore, two different stroke modes suffice. In this manner, the control mode in the case of the manual supply is simplified as much as possible to reduce the trouble to the utmost.

Description will now be made of the copy interruption instruction in the cassette mode. Re-start by the copy key is prevented by PEP, TEP, CEP and OVF. Before completion of the multicopy operation, the gate $G_{18}$ puts out a signal END by stop key STB signal and PEP and LEP signals to inhibit the gate $G_{14}$ and prevent the subsequent preparatory operation of the paper feed roller 13. Accordingly, the multicopy operation is interrupted. In the case of the stop key, copying is re-started with the copy key ON. By TEP and OVF, the multicopy operation is not interrupted but is completed.

It is also possible to divide the sense timing of the detector 16 in the manual supply mode into $x_1 \ldots x_n$ and effect the sense to thereby effect various stroke controls and it is also possible to set a preset number different from that in the cassette mode in $Q_{14}$.

When a sheet from the cassette or a manually supplied sheet has jammed, jam signal JAM is applied to the R ports of $Q_1$-$Q_6$ and $Q_8$ to deenergize all the clutches and the main motor without waiting for the completion of the process.

The flip-flop $Q_8$ for setting the manual supply mode is reset by the reversing signal BP or the jam signal JAM. Also, during the time that the platen moves backwardly after completion of the exposure, manual supply or sheet pick-up from the cassette by the copy key 40 can be effected to enable quick re-start of the copying. By causing the timer $Q_9$ to be started by the AND of the inverted toner absence signal from $G_{21}$ and the detection signal $PS_1$, the manual supply copying can be prevented when OVF and TEP are 1.

As described above, when the manual supply copying is started, the setting of $Q_4$ which drives the cassette roller 13 is inhibited by the set output of $Q_8$, so that the cassette mode is not entered even if the copy key 40 is depressed. However, when the manual supply mode exposure is terminated, $Q_8$ is reset by the BP signal and thus, the inhibition of $Q_4$ is released. Accordingly, sheet pick-up from the cassette can be effected by the copy key 40 before the platen comes to its rest position. Consequently, mode change-over can be achieved a little early.

Also, when a manually supplied sheet is inserted while copying is being repeatedly executed in the cassette mode, the setting of $Q_4$ is inhibited and $Q_2$ is set, so that the cassette mode copying is interrupted and the manual supply copying is carried out preferentially. If the copy key 40 is again depressed after termination of the manual supply copying, the remaining number of copies will be completed.

During the time that copying is being repeated in the cassette mode, it is also possible to inhibit manual supply until the BP signal for the last copy is generated and this can be accomplished by applying another CTU signal to the gate $G_2$.

Figure 10:
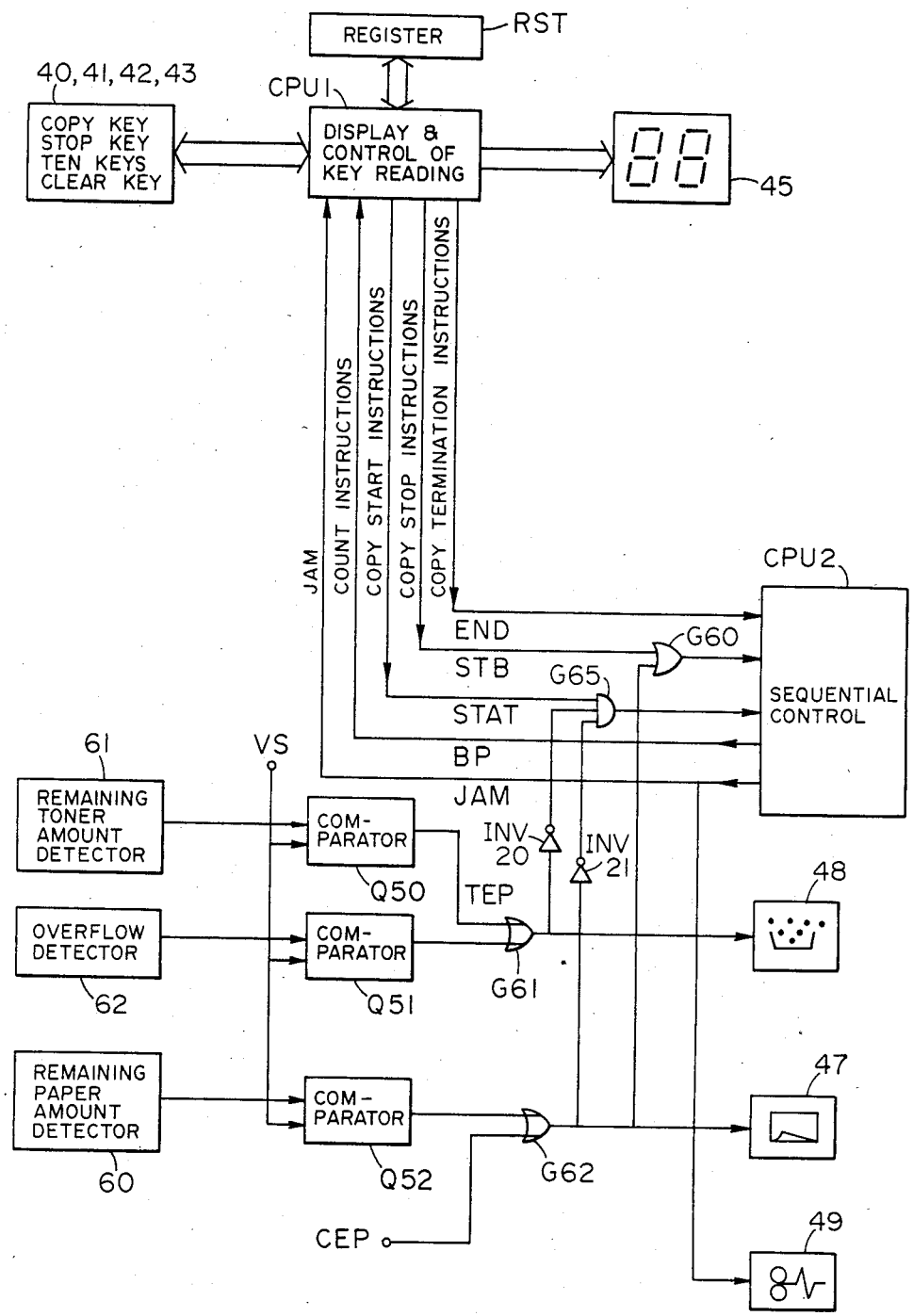
FIG. 10 is a diagram of an example of the display control circuit in the apparatus of FIG. 1.

FIG. 10 shows an example of the circuit for displaying toner absence and overflow. Designated by $Q_{50}$–$Q_{52}$ are operational amplifiers for detecting toner absence, overflow and paper absence, respectively. These operational amplifiers put out their outputs by comparing their detection results with a standard voltage $V_s$. An element 61 judges the toner level in the developer container from the presence or absence of toner intervening between a lamp and a light-receiving member (CdS), and puts out TEP when the quantity of light received exceeds a predetermined level. An element 62 uses a lamp and a light-receiving member and detects toner in the same manner as the element 61 and puts out OVF when the quantity of light received is below the predetermined level. An element 60 puts out PEP in the same manner as the element 61 when the quantity of light received exceeds the predetermined level. $G_{60}$–$G_{62}$ designate OR gates, $G_{65}$ denotes an AND gate, and INV 20–21 designate inverters. $CPU_1$ controls the start, stop and movement of a control unit $CPU_2$ which applies the signals of the ten keys, stop key, copy key and clear key of the operating portion, effects the display operation of the displayer 45, causes the copy preset number by the ten keys to be stored in a register RST (memory) and controls the process sequence.

Operation will now be described. When the toner in the developing device becomes decreased during the copying, signal TEP is put out from the operational amplifier $Q_{50}$. That signal is applied through the gate $G_{61}$ to the toner absence displayer 48, which is thus turned on to give a warning. At the same time, that signal OFF-controls the gate $G_{65}$ through an inverter. Accordingly, even if an attempt is made to re-start the copying by depressing the copy key after the termination of the copying, the copying cannot be re-started because STAT signal is OFF. However, the stop signal STB is not being controlled by TEP so that the preset number of copies set by the ten keys can all be completed even if the lamp 48 is turned on in the course of the copying.

When the toner in the toner collecting container 7 is increased approximately to an overflow condition, signal OVF is put out and like TEP, it controls the starting gate $G_{65}$ through the gate $G_{61}$. At the same time, this is displayed by a displayer which is originally adapted to display toner absence. In this case, the displayer may be caused to effect a display different from TEP which effects turn-on-and-off display. Again in the case of OVF, STB is not controlled but the preset number of copies are completed. The completion of the preset number of copies is accomplished by counting the signal BP (the reversed position of the platen) for each copy cycle by the preset number stored in the register RST and putting out the signal END. The copy interruption is such that by the stop key ON and jam, signal STB is put out and one process cycle during the stop key ON is terminated, whereafter the continuation of the next cycle is prevented, and not all of the preset cycle is executed.

Such prevention is effected during cassette absence or paper absence. That is, by the paper absence signal PEP and cassette absence signal CEP, signal STB is put out to $CPU_2$ through the gates $G_{62}$ and $G_{60}$. Thereby, a treatment similar to that in case of the stop key ON is carried out. Also, PEP and CEP cause the same displayer 47 to display that effect. Alternatively, the display contents may be distinguished from each other by causing one to be turned on and off at a predetermined period and causing the other to be statically turned on.

When sheet jam has been detected, signal JAM is put out to turn on or turn on and off the displayer 49. At the same time, the power sources for dangerous load (high voltage, heater, etc.) are switched off. That is, the process cycle is interrupted in the course thereof so that copying for the preset cycle as well as for one cycle may not take place. However, the power source of CPU and RST can be held so that the preset number is not cancelled even if the main switch 39 is opened. In the case of such jam, the next process re-start can be accomplished by manually closing a switch which releases the jam and cannot be accomplished simply by depressing the copy key.

In addition, it is possible to put the end signal and the output of sensor 61 or 62 into an and gate, and put the output thereof into one of the operation amplifiers $Q_{50}$ and $Q_{51}$. By doing so, the toner absence and the overflow can be detected only after the termination of the preset number of copies, and then it is displayed and the resuming operation is stopped.

In this case, the lamp of sensor 61 or 62 can be controlled by the end signal. Additionally, by controlling the WAIT signal with END signal, the display and the resuming operation can be controlled. The method explained in this paragraph is very effective when the sequence, display and resuming operations are all controlled by a computer (e.g. when the circuits of FIG. 10 are all embodied by a computer).

What we claim is:

1. A copying apparatus having:

a container for holding a number of copy sheets;
an image formation station;
first feed means for feeding a copy sheet from said container to said image formation station;
second feed means for feeding a manually supplied copy sheet to said image formation station;
means for exposure-scanning an original image with one of predetermined different scanning stroke lengths to form a copy image on a copy sheet at said image formation station;
first detector means for detecting the size of the copy sheets in said container and generating a first signal indicative thereof;
second detector means for detecting the size of a manually supplied copy sheet and generating a second signal indicative thereof; and
control means for controlling the movement of said scanning means by selecting one of first, second and third scanning stroke lengths in response to a first signal generated by said first detector means in the case of copying on a copy sheet fed by said first feed means, and by selecting one of said first and second scanning stroke lengths in response to a second signal generated by said second detector in the case of copying on the copy sheet fed by said second feed means.

2. A copying apparatus according to claim 1, wherein said second detector means is positioned on a path along which the copy sheet is fed by said second feed means.

3. An image formation apparatus comprising:
means for exposure-scanning an original image;
means for forming an original image scanned by said scanning means on a sheet fed through a predetermined path;
a container for holding a number of copy sheets;
first feed means for automatically feeding sheets to said path from said container;
second feed means for feeding a manually supplied sheet to said path;
means for selecting one of said first feed means and said second feed means;
means for inhibiting, after the copy sequence for the sheet fed by said one of said feed means selected by said selecting means has been started, the feed operation by the other of said feed means; and
means for deactivating said inhibiting means at a predetermined time after exposure scanning of the original image but before completion of said copy sequence, thereby permitting the feed operation by said other feed means.

4. An image formation apparatus according to claim 3, wherein said exposure-scanning means comprises a movable element and said deactivating means is operated in response to the movement of said movable element.

5. An image formation apparatus comprising:
a cassette for holding a plurality of sheets;
an image formation station;
first feed means for feeding a sheet from said cassette to said image formation station;
second feed means for feeding a sheet manually supplied to said apparatus at an insert location to said image formation station, said cassette and said insert location being positioned at different distances from said image formation station;
detector means for detecting said sheet fed by said second feed means; and
control means for controlling said second feed means in accordance with the detection signal of said detector means, said control means comprising:
timer means operable in response to the detection signal of said detector means; and
means for interrupting the sheet feeding upon arrival of the leading end of a sheet at a predetermined position and again feeding said sheet to said image formation station in response to the function of said timer means.

6. An image formation apparatus according to claim 5, further comprising means for interrupting sheet feeding by said first feeding means, wherein said timer means comprises a timer corresponding to the amount of feed by said first feed means and by said interrupting means.

7. An image formation apparatus according to claim 5, further having second detector means for detecting the sheet and wherein said control means effects feed-on by said second detector means and effects feed-off by said timer means.

8. An image formation apparatus comprising:
an image forming station;
means for forming an image at said image forming station on a manually supplied sheet;
means for detecting the insertion of said sheet;
means for feeding said sheet to said image forming station; and
control means for driving said feeding means and initiating an image forming operation with a delay of predetermined time after the detection of said sheet by said detecting means, wherein the control means does not initiate said image forming operation even after the lapse of said predetermined time if the sheet is removed before the lapse of the predetermined time after the sheet detection by said detecting means.

9. A transfer type image formation apparatus comprising:
a rotatable member;
means comprising charging means and adapted for forming an image on said rotatable member and transferring the image to a transfer sheet;
means adapted for separating the transfer sheet from said rotatable member and comprising means for erasing surface charge from said rotatable member in a band-like area;
means for detecting a manually supplied transfer sheet; and
means for controlling the image formation operation in accordance with said detection means, wherein said detecting means is positioned in facing relation to the surface of said rotatable member from which the charge is erased by said erasing means.

10. A transfer type image forming apparatus according to claim 9, wherein said erasing means comprises a light source for irradiating said rotatable member.

11. A transfer type copying apparatus comprising:
a transfer station;
means for feeding a manually supplied copy sheet to said transfer station;
means for exposure-scanning an original image;
a rotatable member for forming an image and transferring said formed image onto the manually supplied copy sheet at said transfer station;
first detector means for detecting the manually supplied copy sheet;

first control means responsive to detection by said first detector means for controlling said scanning means to initiate the scanning of the original image and for controlling said feeding means to initiate the feeding of the manually supplied copy sheet to a predetermined position before said transfer station;

second detector means for detecting the position of said scanning means; and second control means responsive to detection by said second detector means for controlling said feeding means to advance the manually supplied copy sheet at the predetermined position to said transfer station.

12. A transfer type copying apparatus according to claim 11, further comprising:
a cassette for holding a plurality of sheets, wherein if the copy sheet is not manually supplied, said feeding means feeds the sheet from said cassette to said transfer station in response to detection by said second detector means, and the copying operation is initiated by a copy operation start command.

13. A transfer type copying apparatus according to claim 11, wherein said first control means causes said feeding means to initiate the feeding operation after a predetermined time from the detection by said first detector means.

14. A transfer type copying apparatus according to claim 11, wherein said rotatable member forms the image based on the exposure-scanning by said scanning means, and wherein said first control means further controls said rotatable member to rotate in response to detection by said first detector means and said first control means causes said scanning means to initiate the scanning of the original image when said rotatable member rotates a predetermined amount.

15. An image forming apparatus comprising:
an image forming station;
means for exposure-scanning an original image;
means for feeding a manually supplied sheet to said image forming station;
first detector means for detecting said manual supply of a sheet and generating a first signal indicative thereof;
second detector means for detecting feed of said sheet by said feed means and generating a second signal indicative thereof;
third detector means for detecting the position of said scanning means and generating a third signal indicative thereof; and
control means adapted to activate said feed means in response to a first signal generated by said first detector means, to stop said feed means in response to a second detection signal generated by said second detector means, and to re-activate said feed means in response to a third signal generated by said third detector means.

16. An image forming apparatus according to claim 15, wherein said control means is adapted to control the operation of said scanning means in response to a second signal generated by said second detector means.

17. An image forming apparatus according to claim 15, wherein said control means is adapted to reactivate said feed means in response to a third signal generated by said third detector means, in case said sheet is detected both by said first and second detector means.

18. A copy apparatus comprising:
a container for holding a plurality of copy sheets;
an image forming station;
first feed means for feeding a copy sheet from said container to said image forming station;
second feed means for feeding a manually supplied copy sheet to said image forming station;
means for exposure-scanning an original image to form a copy image on a copy sheet at said image forming station;
control means adapted for controlling said scanning means to operate at one of a first plurality of scanning stroke lengths when the copy sheet is fed by said first feed means and at one of a second plurality of scanning stroke lengths when the copy sheet is fed by said second feed means, wherein the number of said second plurality of scanning stroke lengths for copying operation using said second feed means is less than the number of said first plurality of scanning stroke lengths for copying operation using said first feed means.

19. A copying apparatus according to claim 18, wherein said control means controls said scanning means in accordance with a size of the copy sheet fed to said image forming station.

20. A copying apparatus comprising:
a reciprocable scanning means for scanning an original in a scanning stroke thereof;
image forming means for forming an image of the scanned original on a recording sheet medium fed into the apparatus;
first feed means operable in an automatic supply mode for feeding a recording sheet medium into the apparatus from a supply station;
second feed means operable in a manuaal supply mode for feeding a manually supplied recording sheet medium;
detector means for detecting the size of the recording sheet medium in said supply station; and
control means for controlling the scanning operation of said scanning means, said control means causing said scanning means to perform the scanning operation, in said automatic supply mode, by changing the scanning stroke thereof in accordance with the size detection by said detector means, and in said manual supply mode, with a predetermined scanning stroke without regard to the size detection by said detector means.

21. A copying apparatus according to claim 20, wherein said control means is arranged to control said scanning means so as to select one of plural scanning strokes, in said automatic supply mode, in accordance with the size detection by said detector means.

22. A copying apparatus according to claim 20, wherein, in said manual supply mode, said control means determines the length of the scanning stroke in accordance with the size of the manually supplied recording sheet medium.

* * * * *

UNITED STATES PATENT AND TRADEMARK OFFICE
CERTIFICATE OF CORRECTION

PATENT NO. : 4,563,079

DATED : January 7, 1986

INVENTOR(S) : Inuzuka et al.

It is certified that error appears in the above-identified patent and that said Letters Patent is hereby corrected as shown below:

On the title page in the Abstract on line 13, change "is station coordinated" to --is coordinated--.

On the title page in the Abstract on line 14, change "image formation and" to --image formation station and--.

Column 1, line 27, change "manually supply" to --manual supply--.

Column 3, line 35, change "which is a" to --which a--.

Column 5, line 5, change "exposure surface" to --exposed surface--.

Column 5, line 42, change "an uniform" to --a uniform--.

Column 5, lines 56-7, change "where after" to --whereafter--.

Column 9, line 63, change "repeated as a" to --repeated at a--.

Column 10, lines 11-2, change "judge-ment" to --judgment--.

Column 12, line 44, change "paper/absence to --paper absence--.

Column 13, line 47, change "G24 is put" to --G24 to put--.

Column 14, line 1, change "51 and 0" to --51 are 0--.

UNITED STATES PATENT AND TRADEMARK OFFICE
CERTIFICATE OF CORRECTION

PATENT NO. : 4,563,079

DATED : January 7, 1986

INVENTOR(S) : Inuzuka et al.

It is certified that error appears in the above-identified patent and that said Letters Patent is hereby corrected as shown below:

Column 15, line 20, change "elasped" to --elapsed--.

Column 15, line 28, change "prerotation" to --pre-rotation--.

Column 18, line 52, change "the end signal" to --the END signal--.

Column 18, line 53, change "an and gate," to --an AND gate,--.

Column 18, line 60, change "the end signal." to --the END signal.--.

Column 21, line 55, change "re-activate" to --reactivate--.

Column 22, line 4, change "A copy apparatus" to --A copying apparatus--.

Column 22, line 39, change "manuaal" to --manual--.

Signed and Sealed this

Eleventh Day of November, 1986

Attest:

DONALD J. QUIGG

*Attesting Officer*   *Commissioner of Patents and Trademarks*